Dec. 31, 1968     D. A. LANDAU     3,418,863

CONTROL FOR SPEED VARYING DRIVE

Filed Sept. 29, 1966     Sheet 1 of 2

INVENTOR.
DAVID LANDAU
BY Hood, Gust & Irish
ATTORNEYS

United States Patent Office 3,418,863
Patented Dec. 31, 1968

3,418,863
CONTROL FOR SPEED VARYING DRIVE
David A. Landau, Columbus, Ind., assignor to The Reliance Electric and Engineering Company, Cleveland, Ohio, a corporation of Ohio
Filed Sept. 29, 1966, Ser. No. 582,978
6 Claims. (Cl. 74—230.17)

ABSTRACT OF THE DISCLOSURE

For use with a speed varying device comprising an expansible V-pulley including an axially-shiftable disc, a resiliently-expansible V-pulley and an edge-active belt providing a driving connection between said pulleys; a shifter mechanism comprising a screw shaft fixedly journalled on an axis perpendicular to the axis of the first-named pulley, a traveling nut threadedly mounted on the screw shaft and held against rotation therewith, and a first rigid link means pivotally mounted on an axis perpendicular to the screw shaft axis and to said pulley axis, the three said axes intersecting at a common point. A second link means is intermediately pivotally mounted on the first link means on an axis parallel with and spaced from the pivotal axis of the first link means, one arm of the second link means operatively engaging the traveling nut and the other arm of the second link means operatively engaging the shiftable disc.

---

The present invention relates to speed varying drives, and more particularly to the means and methods for providing a control for a speed varying device of the expansible V-pulley type. The present invention is directed to means for axially shifting one of a pair of coned discs which cooperate to form an expansible V-pulley.

The present invention is an important advance in the speed varying drive art because a control is provided which is much more efficient and effective for the use intended than contemporary controls. Specifically, the control of the present invention is so proportioned and arranged that an expansible V-pulley can be adjusted to increase or decrease the effective diameter thereof with a minimum of input power required for operating the control.

It is an object of the present invention, therefore, to provide a control for a speed varying device of the expansible V-pulley type including a frame, an input shaft and an output shaft journalled in said frame, a first expansible V-pulley comprising a mating pair of coned discs mounted on said input shaft for rotation and with their coned surfaces in facing relation, one of said coned discs being arranged for axial reciprocation with respect to the other, a second expansible V-pulley comprising a mating pair of coned discs mounted on said output shaft for rotation and with their coned surfaces in facing relation, one of said coned discs being arranged for axial reciprocation with respect to the other, and an edge-active belt providing a driving connection between said pulleys, said control comprising means for reciprocating said one of said coned discs of said first V-pulley.

Another object of the present invention is to provide a toggle mechanism for axially reciprocating a coned disc of an expansible V-pulley, said toggle mechanism being proportioned and arranged to provide a maximum adjusting force for said coned disc with a minimum of input power applied to said toggle mechanism.

A further object of the present invention is to provide a toggle mechanism for controllably reciprocating a coned disc of an expansible V-pulley, said toggle mechanism being proportioned and arranged to provide a variable mechanical advantage, said mechanical advantage being such as to provide a maximum holding power when the two halves of the expansible V-pulley are held closer together and less holding power when the two halves of the expansible V-pulley are held farther apart.

Further objects of the invention will appear as the description proceeds.

To the accomplishment of the above and related objects, the present invention may be embodied in the forms illustrated in the accompanying drawings, attention being called to the fact, however, that the drawings are illustrative only, and that changes may be made in the specific constructions illustrated and described, so long as the scope of the appended claims is not violated.

Figure 1:
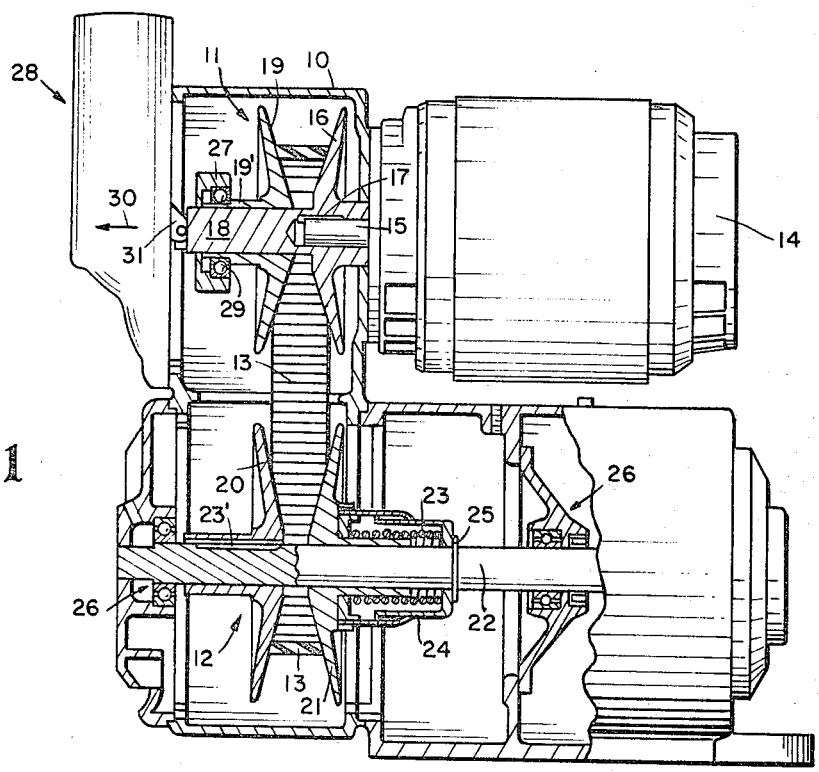
FIG. 1 is a sectional view of an enclosed speed varying device of the expansible V-pulley type with the control of the present invention cooperatively associated therewith.

Referring now to the drawings, an illustrative structure of the present invention can be visualized in conjunction with the following description.

In FIG. 1, a variable speed drive of the type which may be adjusted by the control of the present invention is illustrated. The variable speed drive comprises a housing 10 having a first expansible V-pulley, indicated generally by the reference number 11, and a cooperating, second expansible V-pulley, indicated generally by the reference number 12, rotatably mounted therein. An edge-active belt 13 is trained over the pulleys 11 and 12 to provide a driving connection therebetween. A motor 14 is mounted on the housing 10 and arranged to have its output shaft 15 extend therein. The pulley 11 is driven by the shaft 15. Specifically, one of the coned discs 16 of the V-pulley 11 is axially-fixedly mounted on the shaft 15 and fastened thereto by means of a key 17 so as to be rotated thereby. The coned disc 16 has an elongated hub 18 which is coaxial with the shaft 15. It can be seen in FIG. 1 that the axially reciprocable coned disc 19 of the V-pulley 11 is mounted for reciprocation on the hub 18 and that the coned surfaces of the coned discs 16 and 19 are in facing relation.

The pulley 12 comprises a fixed coned disc 20 and an axially reciprocable coned disc 21, both of which are mounted on a shaft 22, which is the output shaft of the variable speed drive. It can be seen that the coned surfaces of the discs 20 and 21 are also in a facing relation. The coned disc 20 is fixed to the shaft by means of a key 23'. The movement of the coned disc 21 away from its mating coned disc 20 is opposed by a spring 23 which is arranged in a housing 24 of the type disclosed in the U.S. Patent No. 2,842,355. A locking ring 25 is disposed about the shaft 22 to secure the housing 24.

The output shaft 22 is journalled in the housing 10 by means of bearings, indicated generally by the reference number 26.

There is a bearing housing 27 operatively connected to the control of the present invention, indicated generally by the reference number 28. In FIG. 1, it can be seen that the bearing housing 27 is operatively connected to the outer race of a thrust bearing 29 and that the inner race of the thrust bearing 29 is mounted on a hub 19' of the coned disc 19. Thus, the coned disc 19 is reciprocated by the control 28 which reciprocates the bearing housing 27 and the thrust bearing 29.

Variable speed drives, of the type described above, provide an output speed depending on the axial position of the coned disc 19. That is, the rotational speed of the output shaft 22 is dependent on the effective diameters of the V-pulleys 11 and 12. When the axially reciprocable coned disc 19 is moved closer to the coned disc 16, the speed of the output shaft 22 is increased and when the coned disc 19 is moved away from the coned disc 16, the speed of the output shaft 22 is decreased.

It can be seen, therefore, that increasing the effective diameter of the V-pulley 11 decreases the effective diameter of the V-pulley 12. As the effective diameter of the V-pulley 12 is decreased, that is, the coned disc 21 is moved axially away from the coned disc 20, energy is stored in the spring 23. When the bearing housing 27 is moved or permitted to move in the direction of the arrow 30 by the control 28, the energy stored in the spring 23 is effective to move the coned disc 21 toward the coned disc 20, thereby moving the coned disc 19 in the direction of the arrow 30.

Figure 2:
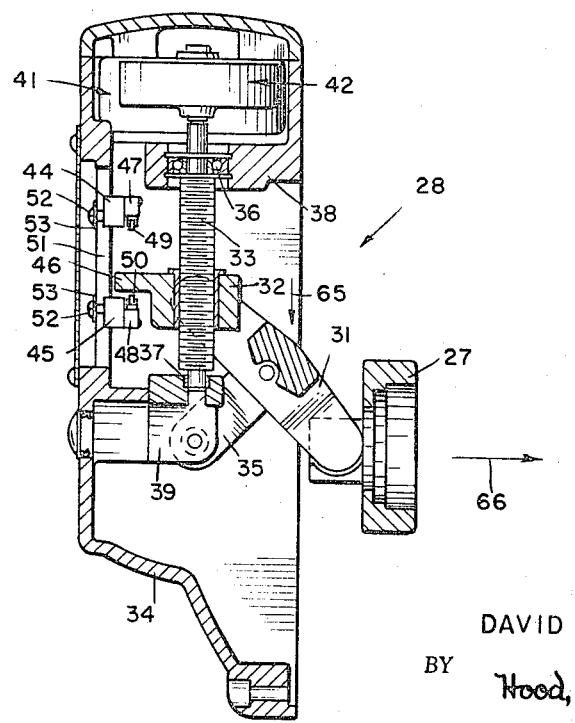
FIG. 2 is an enlarged sectional view of the control of the present invention showing the various elements of a toggle mechanism operatively connected to a thrust bearing housing.
Figure 3:
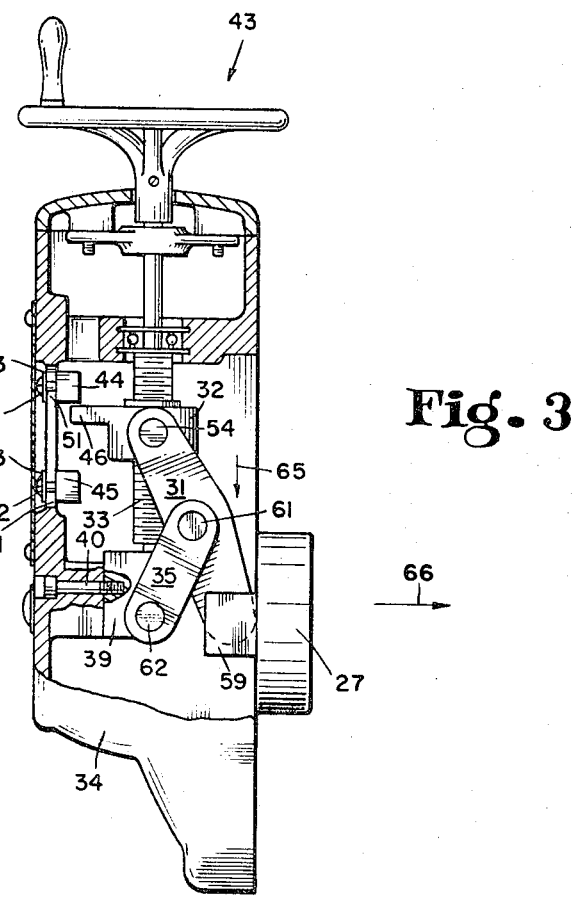
FIG. 3 is a sectional view of the control of the present invention illustrating a hand crank for rotating the shifting screw of the aforementioned toggle mechanism.
Figure 4:
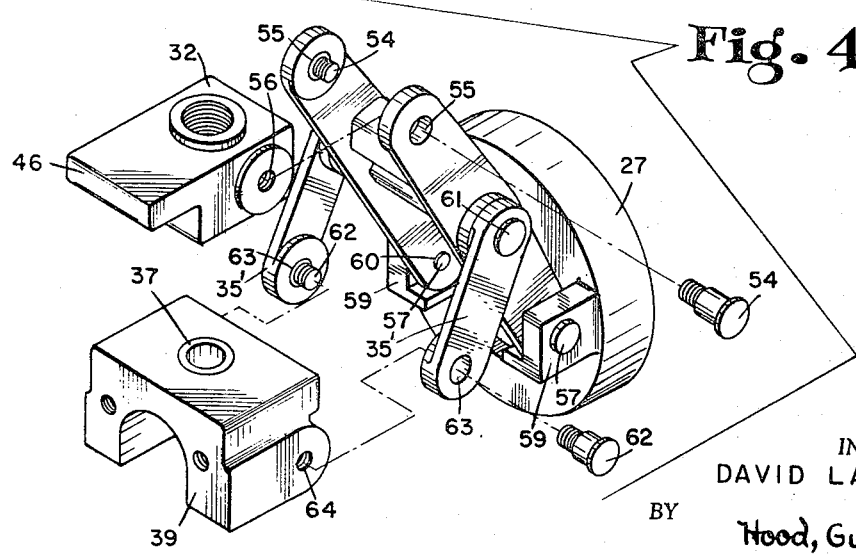
FIG. 4 is an exploded perspective view of the linkage means which is operated by the movement of a traveling nut to reciprocate the aforementioned thrust bearing housing.

The control 28 comprises a plurality of elements which are clearly shown in FIGS. 2, 3, and 4. There is a first link means 31 having one end proportioned and arranged to reciprocate the bearing housing 27 and its other end pivotally connected to a traveling nut 32. The traveling nut 32 is carried by a threaded shaft 33 which is journalled in a housing 34 for the control 28 so as to extend in a direction substantially perpendicular to the direction of the shaft, such as the hub 19', about which the bearing housing 27 is disposed. Preferably, the axis of the threaded shaft 33 intersects the axis of the hub 19'. There is a second link means 35 having one end pivotally connected to the center of the first link means 31 and its other end arranged to pivot about an axis extending substantially perpendicularly to the axes of the threaded shaft 33 and the hub 19'. The pivot axis of the second link means 35 extends through the intersection point of the axes of the threaded shaft 33 and the hub 19'.

The threaded shaft 33 is journalled in the housing 34 by means of a bearing 36 and a bushing 37. In the illustrative embodiment, the bearing 36 is retained in a portion 38 of the housing and the bushing 37 is retained in a pivot block 39 secured to the housing, as shown in FIG. 3, by means of screws 40, only one of which is shown.

In FIG. 2, it can be seen that a reversible motor indicated generally by the reference number 41, and a gear reduction means, indicated generally by the reference number 42, are operatively arranged in the housing 34. The motor 41 is drivingly connected to the gear reduction means 42 which is drivingly connected to the threaded shaft 33. In FIG. 3, it can be seen that a hand crank, indicated generally by the reference number 43, is drivingly connected to the threaded shaft 33. Thus, the control 28 can be adapted for electrical or manual operation.

There is a pair of adjustably movable stops 44 and 45 mounted so as to determine the stroke of the traveling nut 32. The traveling nut 32 is provided with a protrusion 46 which moves between the stops 44 and 45. In FIG. 2, it can be seen that a limit switch 47 is mounted on the stop 44 and a limit switch 48 is mounted on the stop 45. The limit switches 47 and 48 have actuating arms 49 and 50, respectively, arranged to be operated by movement of the protrusion 46 thereagainst. The limit switches 47 and 48 are operatively connected to the motor 41 so as to de-energize the motor before the protrusion 46 of the traveling nut 32 moves against the stop 44 or the stop 45. The limit switches 47 and 48 are not required for the manually operated control 28 shown in FIG. 3.

In the illustrative embodiment of FIGS. 2 and 3, the stops 44 and 45 are movably mounted in a slot 51 in the housing 34. A screw 52 and washer 53 are provided for securing each stop 44 and 45 in a pre-selected position along the slot 51. The screws 52 extend through the slot 51 and are threadedly received in the stops 44 and 45. The washers 53 bridge across the slot 51.

Referring now to FIG. 4, an exploded perspective view of the toggle mechanism of the control 28 will be discussed.

The link means 31, which is shown substantially H-shaped, is pivotally connected to the traveling nut 32 by means of studs 54 which extend through holes 55 in the link means 31 and which are threadedly received in the holes 56, only one of which is shown, in the traveling nut 32. The other end of the link means 31 is pivotally connected to the bearing housing 27 by means of studs 57, similar to the studs 54, which extend through spaced ears 59 extending from the back of the bearing housing 27 and into threaded holes 60, only one of which is shown, in the link means 31. In another embodiment of the present invention, as illustrated in FIGS. 2 and 3, the link means 31 is proportioned and arranged to push against the bearing housing 27, but is not pivotally connected thereto as is shown in FIG. 4.

In the presently preferred embodiment of the present invention, the link means 35 comprises a pair of links 35', each having one end pivotally connected to the center of the link means 31 and its other end pivotally connected to the pivot block 39. In FIG. 4, it can be seen that the links 35' are pivotally connected to the link means 31 by means of studs 61, similar to the studs 54 and 57, which extend through holes in the ends of the links 35' and which are threadedly received in holes in the link means 31. Only one of the studs 61 is shown in FIG. 4. The opposite ends of the links 35' are pivotally connected to the pivot block 39 by means of studs 62 which extend through holes 63 in the links 35 and which are threadedly received in holes 64, only one of which is shown, in the pivot block 39.

In the preferred embodiment of the present invention, the forces exerted on the bearing housing 27 are axial and not radial. Referring to FIG. 1, it can be seen that since the bearing housing 27 is only permitted to move axially, radial forces applied by the link means 31 will only tend to bind the housing 27 and, consequently, provide a radial load for the thrust bearing 29. In operation of the variable speed drive shown in FIG. 1, it is important that only thrust loads and not radial loads be exerted on the thrust bearing 29. In order to provide only axial loading of the bearing housing 27, the length of the link means 31 is made substantially twice the length of the link means 35. That is, the distance from the center of the studs 54 to the center of the studs 61 is equal to the distance between the center of the studs 61 and the center of the studs 62. Also, the distance between the center of the studs 57 and the center of the studs 61 is equal to the distance between the center of the studs 61 and the center of the studs 62.

With the above structural description in mind, and by making reference to the drawings, the following operational analysis will serve to convey the functional details of the present invention.

Rotation of the threaded shaft 33 causes reciprocation of the traveling nut 32 within limits established by the stops 44 and 45. When the traveling nut 32 is moved in the direction of the arrow 65, the bearing housing 27 is moved in the direction of the arrow 66. Similarly, movement of the traveling nut 32 in a direction opposite to the arrow 65 will move or permit movement of the bearing housing 27 in a direction opposite to the arrow 66.

The toggle mechanism of the present invention is so arranged that a variable mechanical advantage is obtained depending on the position of the traveling nut 32. That is, when the traveling nut 32 is closer to the stop 45, as shown in FIG. 2, there is a greater mechanical advantage than when the traveling nut is closer to the stop 44, as shown in FIG. 3. Thus, for a given level of input torque on the threaded shaft 33, the toggle mechanism is capable of exerting more force against the bearing housing 27 when the traveling nut 32 is closer to the stop 45 than it is when the traveling nut 32 is closer to the stop 44. This is an especially important feature because more holding force is required for the bearing housing 27 when the traveling nut 32 is closer to the stop 45 than is required when the traveling nut 32 is closer to the stop 44. That is, when the traveling nut 32 is closer to the stop 45, the spring 23 is more heavily compressed.

An especially attractive feature of the control 28 is that the connection of the link means 35 to the center of the link means 31, as described in conjunction with FIGS. 2, 3 and 4, acts to reduce or eliminate radial forces applied to the traveling nut 32 and, consequently, the threaded shaft 33 and the bearing housing 27. Specifically, components of force which would normally be radial to the axis of the threaded shaft 33 and the axis about which the bearing housing 27 is disposed are vectored in the direction of the link means 35. Since significant radial forces are not exerted on the threaded shaft 33 to cause bending, a smaller diameter shaft can be utilized, thereby resulting in considerable cost savings.

Since the toggle mechanism of the control 28 is more efficient than contemporary toggle mechanisms used for similar purposes, a considerable saving can be obtained by utilizing smaller and less expensive motors to drive the threaded shaft 33.

It is to be noted that contemporary devices for controlling variable speed drives of the type discussed above in conjunction with FIG. 1 require greater torque for rotating the shifting screws, such as the threaded shaft 33, for higher output speeds of the variable speed drive than is required for lower speeds. The control 28 of the present invention, to the contrary, requires more torque on the threaded shaft 33 for lower output speeds of the variable speed drive than is required for higher output speeds.

I claim as my invention:

1. A control for a speed varying device of the expansible V-pulley type including a frame, an input shaft and an output shaft journalled in said frame, a first expansible V-pulley comprising a mating pair of coned discs mounted on said input shaft for rotation and with their coned surfaces in facing relation, one of said coned discs being arranged for axial reciprocation with respect to the other, a second expansible V-pulley comprising a mating pair of coned discs mounted on said output shaft for rotation and with their coned surfaces in facing relation, one of said coned discs being arranged for axial reciprocation with respect to the other, and an edge-active belt providing a driving connection between said pulleys, said control comprising a first link means having one end proportioned and arranged to reciprocate said one of said coned discs of said first V-pulley, the other end of said first link means being pivotally connected to a traveling nut, said traveling nut being carried by a threaded shaft extending substantially perpendicularly to said input shaft, said threaded shaft being journalled in said frame with the axis of said threaded shaft intersecting the axis of said input shaft, a second link means having one end pivotally connected to a center portion of said first link means and its other end arranged to pivot about an axis extending substantially perpendicularly to the axes of said threaded shaft and said input shaft, said pivot axis of said second link means extending through the intersection point of said axes of said threaded shaft and said input shaft, and means for driving said threaded shaft to reciprocate said traveling nut, thereby operating said first link means.

2. A control as in claim 1 wherein the length of said first link means is substantially twice the length of said second link means.

3. A control as in claim 1 wherein said one end of said first link means is pivotally connected to a housing for a thrust bearing, the inner race of said thrust bearing being operatively connected to said one of said coned discs of said first V-pulley and the outer race of said thrust bearing being operatively connected to said housing, said one of said coned discs of said V-pulley thereby being reciprocable toward and away from its mate in response to movement of said first link means.

4. A control as in claim 1 including a pair of spaced apart limit switches arranged to be operated by said traveling nut, said limit switches being adjustably mounted in said frame selectively to determine the stroke of said traveling nut, wherein said driving means includes a reversible electric motor operatively connected to drive said threaded shaft, and wherein said limit switches are operatively connected to said motor.

5. Means for controllably reciprocating a coned disc of an expansible V-pulley of the type including a mating pair of coned discs mounted on a shaft for rotation and with their coned surfaces in facing relation, said coned disc being arranged for axial reciprocation with respect to its mate, said reciprocating means comprising a first link means having one end proportioned and arranged to reciprocate said coned disc, the other end of said link means being pivotally connected to a traveling nut, said traveling nut being carried by a threaded shaft extending substantially perpendicularly to said shaft carrying said coned disc, a second link means having one end pivotally connected to a center portion of said first link means and its other end arranged to pivot about an axis extending substantially perpendicularly to the axes of said threaded shaft and said shaft carrying said coned disc, and means for driving said threaded shaft to reciprocate said traveling nut, thereby reciprocating said coned disc.

6. For use with a speed varying device comprising an expansible V-pulley including an axially-shiftable disc, a resiliently-expansible V-pulley and an edge-active belt providing a driving connection between said pulleys; the invention which comprises shifter mechanism for said shiftable disc, said shifter mechanism including a screw shaft fixedly journalled on an axis perpendicular to the axis of said first-named pulley, a nut threadedly mounted on said shaft and held against rotation, a first rigid link means pivotally mounted on an axis perpendicular to said screw shaft axis and to said pulley axis, said three axes intersecting at a common point, and a second rigid link means intermediately pivotally mounted on said first link means on an axis parallel with and spaced from the pivotal axis of said first link means, one arm of said second link means operatively engaging said nut and the other arm of said second link means operatively engaging said shiftable disc.

References Cited

UNITED STATES PATENTS

| | | | |
|---|---|---|---|
| 2,021,136 | 11/1935 | Reeves | 74—230.17 |
| 2,636,396 | 4/1953 | Reeves | 74—230.17 |
| 3,009,363 | 11/1961 | Kohn et al. | 74—230.17 |
| 3,150,527 | 9/1964 | Trawdel | 74—230.17 |

C. J. HUSAR, *Primary Examiner.*